US007873604B2

(12) United States Patent
Little

(10) Patent No.: US 7,873,604 B2
(45) Date of Patent: Jan. 18, 2011

(54) BATCH RECOVERY OF DISTRIBUTED TRANSACTIONS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 408 days.

(21) Appl. No.: 12/129,662

(22) Filed: May 29, 2008

(65) Prior Publication Data

US 2009/0300074 A1    Dec. 3, 2009

(51) Int. Cl.
*G06F 17/00* (2006.01)
(52) U.S. Cl. ................ 707/682; 707/613; 707/635; 707/643; 718/101
(58) Field of Classification Search .......... 718/101
See application file for complete search history.

(56) References Cited

U.S. PATENT DOCUMENTS

| 5,428,771 | A | * | 6/1995 | Daniels et al. ............. 718/101 |
| 5,680,610 | A | * | 10/1997 | Smith et al. ................. 1/1 |
| 5,896,503 | A | * | 4/1999 | Badovinatz et al. ......... 709/201 |
| 6,012,094 | A | * | 1/2000 | Leymann et al. ............ 709/230 |
| 6,052,695 | A | * | 4/2000 | Abe et al. ................... 1/1 |
| 6,738,971 | B2 |  | 5/2004 | Chandrasekaran et al. |
| 2006/0174224 | A1 | * | 8/2006 | Parkinson et al. .......... 717/120 |

OTHER PUBLICATIONS

Liu et al, "The Performance of Two-phase Commit Protocols in the Presence of Site Failures", In Proceedings of the 24$^{th}$ International Symposium on Fault-Tolerant Computing, 1994.*

"JBoss Transactions 4.2.3, Failure Recovery Guide" Apr. 4, 2007, 33 pages, JBoss Inc.
Abdallah, Maha, et al., "One-Phase Commit: Does it Make Sense?", Lab. PRiSM, Univ. de Versailles, 11 pages, Dec. 14-16, 1998, ISBN 0818686030.
Lampson, Butler, et al. "A New Presumed Commit Optimization for Two Phase Commit", Feb. 10, 1993, CRL 93/1, Digital Equipment Corporation, Cambridge Research Laboratory Technical Report Series. Copyright Digital Equipment Corporation 1993, 26 pages.
Samaras, George, et al., "Two-Phase Commit Optimization and Tradeoffs in the Commercial Environment", 1063-6382/93, Copyright 1993 IEEE, pp. 520-529.
Abdallah, M., et al., "One-phase commit: does it make sense?", Parallel and Distributed Systems, 1998, Proceedings, 1998 International Conference , Dec. 14-16, 1998 pp. 182-192.

(Continued)

*Primary Examiner*—Apu M Mofiz
*Assistant Examiner*—Hung D Le
(74) *Attorney, Agent, or Firm*—Blakely, Sokoloff, Taylor & Zafman LLP

(57) ABSTRACT

A recovery manager detects that a distributed transaction is unresolved for a first participant of said distributed transaction. The recovery manager identifies that the distributed transaction is unresolved for a second participant of said distributed transaction. The recovery manager generates a list of participants for which the distributed transaction is unresolved, the list including an entry for the first participant and an additional entry for the second participant. The recovery manager determines a result of the distributed transaction based on information received from a remote coordinator of said distributed transaction. The recovery manager notifies each participant identified in the list of the result.

14 Claims, 4 Drawing Sheets

OTHER PUBLICATIONS

"JBoss Transactions 4.2.3, JTS Programmers Guide", © 2006, 117 pages.

Johnson, Rod, et al., "Spring java/j2ee Application Framework, The Spring Framework—Reference Documentation", Version 2.5.6, © 2004-2008, 590 pages.

Lampson, Butler and Lomet, David, "A New Presumed Commit Optimization for Two Phase Commit", Cambridge Research Laboratory, Technical Report Series, Feb. 10, 1993, 26 pages.

Samaras, George, et al., "Two-Phase Commit Optimizations and Tradeoffs in the Commercial Environment", IBM Distributed Systems Architecture, IBM Almaden Research Center, pp. 520-529.

* cited by examiner

BATCH RECOVERY OF DISTRIBUTED TRANSACTIONS

TECHNICAL FIELD

Embodiments of the present invention relate to distributed transactions, and more specifically to improving efficiency of distributed transaction recovery.

BACKGROUND

Distributed transactions are often performed on distributed computing systems. Herein, a distributed computing system that performs distributed transactions is referred to as a distributed transaction system. A distributed transaction is a set of operations that update shared objects. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared objects. The Isolation property requires that intermediate effects of the transaction are not detectable to concurrent transactions. Finally, the Durability property requires that changes to shared objects due to the transaction are permanent.

To ensure the Atomicity property, all participants of the distributed transaction must coordinate their actions so that they either unanimously abort or unanimously commit to the transaction. A two-phase commit protocol is commonly used to ensure Atomicity. Under the two-phase commit protocol, the distributed system performs the commit operation in two phases. In the first phase, commonly known as the prepare phase or request phase, a coordinator node (a node in the distributed transaction system managing the transaction) asks all participant nodes whether they are willing to commit to the transaction. During the second phase, commonly known as the commit phase, the coordinator node determines whether the transaction should be completed. If during the prepare phase all participant nodes committed to the transaction, the coordinator node successfully completes the transaction. If during the prepare phase one or more participant nodes failed to commit to the transaction, the coordinator node does not complete the transaction.

To accurately track distributed transactions, participants and coordinators log the distributed transactions. If a coordinator or participant fails during a transaction, the log provides a record that the participant node was involved in the transaction.

A distributed transaction system generally includes a recovery subsystem. The recovery subsystem includes multiple recovery managers, each of which scans logs of participants and coordinators that operate on a server on which the recovery manager runs. Whenever the recovery manager identifies an unresolved transaction in a participant's transaction log, it sends a message to a coordinator of the transaction to inquire as to whether the transaction was aborted or committed. It can then direct the participant to commit or abort the transaction based on a response that it receives from the coordinator. The recovery manager performs such recovery operations in a sequential manner. Therefore, it may separately find and resolve the same unresolved transaction for multiple participants, one at a time. For each participant, a separate message is sent to the coordinator, and a separate response is received.

Whenever the recovery manager identifies an unresolved transaction in a coordinator's transaction log, it sends a separate message to each participant of the transaction to resolve the transaction. This is true even if multiple participants operate on the same server. Thus, recovery of a single transaction often includes multiple messages passed between a coordinator and participants of the transaction.

BRIEF DESCRIPTION OF THE DRAWINGS

The present invention is illustrated by way of example, and not by way of limitation, in the figures of the accompanying drawings and in which.

DETAILED DESCRIPTION

Figure 1:
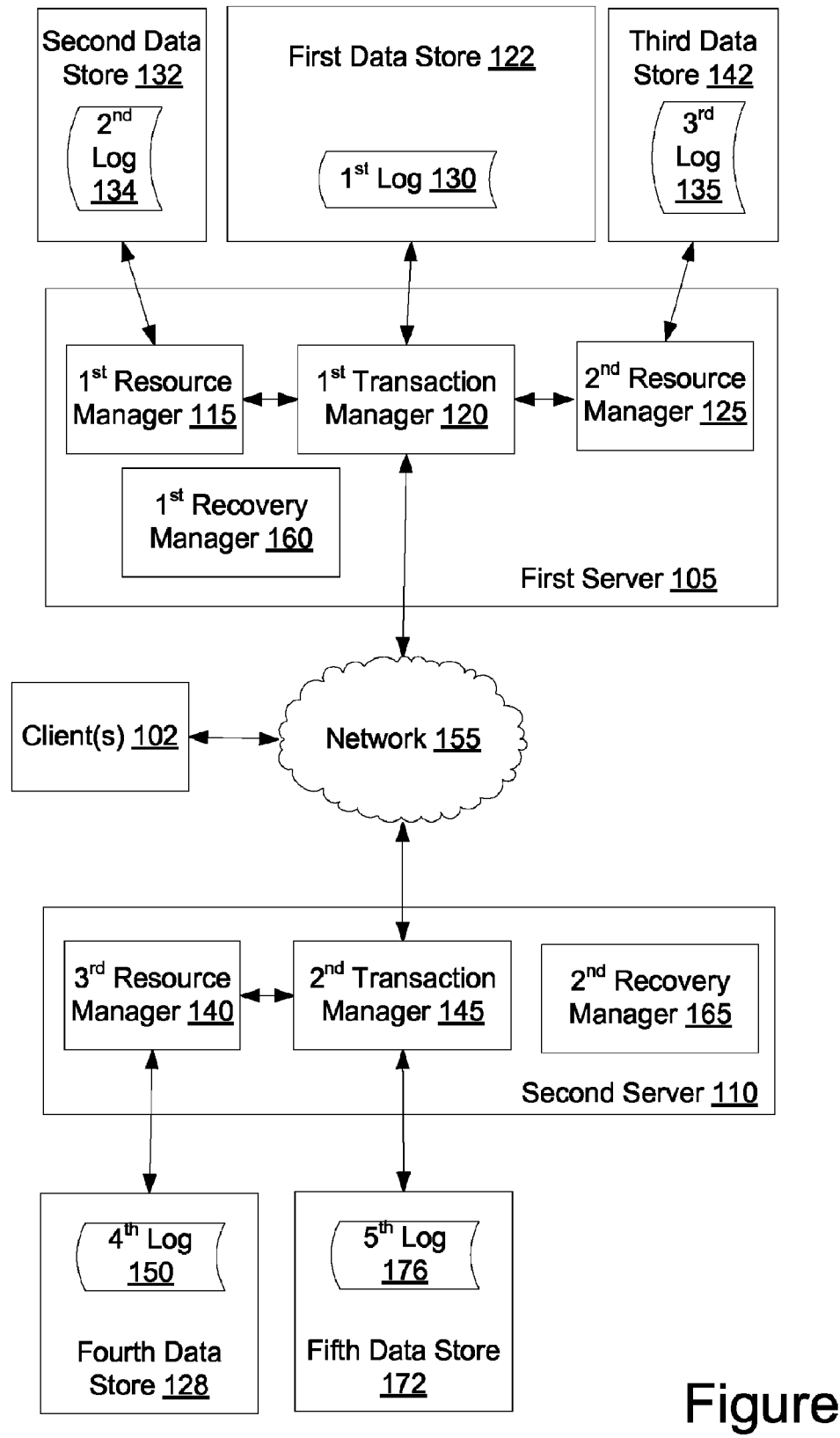
FIG. 1 illustrates an exemplary distributed transaction system, in which embodiments of the present invention may operate.

Described herein is a method and apparatus for recovering distributed transactions. In one embodiment, a recovery manager detects that a distributed transaction is unresolved for a first participant of the distributed transaction. The recovery manager may identify that the distributed transaction is also unresolved for a second participant of the distributed transaction. Each of the participants may be a resource manager and/or a transaction manager. The recovery manager then generates a list of participants for which the distributed transaction is unresolved, the list including an entry for each participant. A coordinator of the distributed transaction is queried to determine a result of the transaction. In one embodiment, a single message is sent to the coordinator of the unresolved distributed transaction to inquire whether the transaction was committed or rolled back. A single commit or roll back response can then be received from the coordinator in response. Once the result is determined, the recovery manager notifies each entry in the list of the result.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "managing", "using", "adding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary distributed transaction system 100, in which embodiments of the present invention may operate. The distributed transaction system 100 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services. In one embodiment, the distributed transaction system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In one embodiment, the distributed transaction system 100 includes one or more clients 102, a first server 105 and a second server 110 connected via a network 155. Alternatively, the distributed transaction system 100 may only include a single server and/or the client 102 may be directly connected with the first server 105 or the second server 110.

Client(s) 102 may be, for example, personal computers (PC), palm-sized computing devices, personal digital assistants (PDA), etc. Client(s) 102 may also be applications run on a PC, server, database, etc. In the SOA, client(s) 102 include applications that access services. Client(s) 102 may be fat clients (client that performs local processing and data storage), thin clients (client that performs minimal or no local processing and minimal to no data storage), and/or hybrid clients (client that performs local processing but little to no data storage). In one embodiment, clients access services that initiate distributed transactions.

Each of the first server 105 and second server 110 may host services, applications and/or other functionality that is available to clients 102 on the distributed transaction system 100. The first server and second server may be coupled in a cluster configuration or in a non-cluster configuration. The network 155 may be a private network (e.g., local area network (LAN), wide area network (WAN), intranet, etc.), a public network (e.g., the Internet), or a combination thereof.

In one embodiment, the first server 105 includes a first transaction manager 120 and the second server 110 includes a second transaction manager 110. A transaction manager is a component that coordinates multiple participants during a distributed transaction. A participant may be another transaction manager (e.g., second transaction manager 145) or a local resource manager (e.g., first resource manager 115 and second resource manager 125). Coordinating a distributed transaction may include assigning identifiers to the transaction, monitoring progress of the transaction, taking responsibility for transaction completion, and providing fault recovery for the transaction. Taking responsibility for transaction completion may include determining whether each participant can commit to a transaction, directing each participant to commit if all participants can commit to the transaction, and directing each participant to rollback if not all participating nodes are able to commit. Providing fault recovery may include maintaining a log of transactions that can be used by participants to recover from a system failure.

Any transaction manager in the distributed transaction system 100 is capable of operating as a coordinator node. Generally, it is a transaction manager that is located at a node at which a transaction is begun or requested (e.g., a node from which a service is requested by the client) that operates as the coordinator node for that distributed transaction. However, it is not a requirement that a node that begins a transaction act as coordinator node for that transaction. Moreover, a transaction manager can hand responsibility over to another node, causing a transaction manager of that other node to become the coordinator node.

In one embodiment, first transaction manager 120 acts as a master coordinator node, and coordinates a distributed transaction between first resource manager 115, second resource manager 125 and second transaction manager 145. Alternatively, second transaction manager 145 may act as a master coordinator node. A master coordinator node is a transaction manager that acts on behalf of a process that initiates a distributed transaction (e.g., by initiating a commit operation) to coordinate all participants of the distributed transaction. A master coordinator node must arrive at a commit or abort decision and propagate that decision to all participants.

In another embodiment, first transaction manager 120 and/or second transaction manager 145 may act as an intermediate coordinator node. An intermediate coordinator node is a transaction manager that acts on behalf of a process that participates in a distributed transaction to coordinate local resource managers and/or additional transaction managers that are participants in the distributed transaction. For example, first transaction manager 120 may coordinate a distributed transaction between only first resource manager 115 and second resource manager 125. An intermediate coordinator node gathers information about the participants that it manages, and reports the information to a master coordinator node. An intermediate coordinator node also receives commit or abort decisions from a master coordinator node, and propagates the decisions to participants that it manages.

In one embodiment, first server 105 is connected with a first data store 122, a second data store 132 and a third data store 142. Likewise, second server 100 is connected with a fourth data store 128 and a fifth data store 172. Data stores may include file systems, databases, or other data storage arrangements. First data store 122, second data store 132 and third data store 142 may be components of a single data store, or may be separate data stores. Similarly, fourth data store 128 and fifth data store 172 may be components of a single data store, or may be separate data stores. Data stores may be internal to first server 105 or second server 110 or external to first server 105 or second server 110 (e.g., connected with first server 105 or second server 110 directly or via a network).

In one embodiment, first transaction manager 120 maintains a first log 130 of active transactions for which first transaction manager 120 acts as a coordinator in the first data store 122. Likewise, second transaction manager 145 maintains a fifth log 176 of active transactions for which the second transaction manager 145 acts as the coordinator. Each transaction entry in the first log 130 and fifth log 176 may include an identification of the transaction (e.g., a transaction identification number), a process identification of the process that initiated the transaction, a description of the transaction, a list of participants of the transaction, a timestamp identifying when the transaction was started and/or additional data.

The first transaction manager 120 and/or second transaction manager 145 may operate using the presumed nothing, presumed commit or presumed abort optimizations. In the presumed nothing optimization, information about a transaction is maintained in the first log 130 or fifth log 176 (depending on the transaction manager that is coordinating the transaction) until all participants acknowledge an outcome of the transaction. In the presumed nothing optimization, the log is written to whether the transaction is to be committed or aborted (rolled back). According to the presumed abort optimization a transaction manager only maintains information about a transaction (e.g., in first log 130 or fifth log 176) if the transaction is committed. Therefore, in the absence of information about a transaction, the transaction manger presumes that the transaction has been aborted. In the presumed commit optimization, the transaction manager maintains records of aborted transactions. In the absence of information about a transaction the transaction manager presumes that the transaction was successfully completed.

In one embodiment, first transaction manager 130 maintains an entry in the first log 130 for each participant of a specified transaction. As the first transaction manager 120 receives confirmation from participants that they successfully committed or rolled back the transaction, it may remove the entry corresponding to that participant from the first log 130. Until confirmation has been received from all participants of the transaction, the transaction may remain unresolved for the first transaction manager 120. Once the first transaction manager 120 receives messages from all participants indicating that they have successfully completed or rolled back the transaction, first transaction manager 120 deletes the log corresponding to that transaction. This minimizes the amount of storage capacity of first data store 122 that is required to maintain the first log 130. The second transaction manager 145 may also maintain entries in the fifth log 176 in the manner described with reference to the first transaction manager 120 and first log 130.

In one embodiment, first server 105 includes a first resource manager 115 and a second resource manager 125, and second server 110 includes a third resource manager 140. A resource manager is a component that manages a persistent and stable storage system. Examples of resource managers include databases and file managers.

Each resource manager that participates in a distributed transaction may be a participant node of the transaction. During a prepare phase of a two-phase commit distributed transaction, a participant node is asked whether it can commit to the transaction by a coordinator node (e.g., an intermediate coordinator node or a master coordinator node). If the resource manager can commit to the transaction, it sends a commit response to the coordinator node. If the resource manager cannot commit to the transaction, it sends an abort message to the coordinator node.

During a commit phase of a two-phase commit distributed transaction, each resource manager receives a commit command if all resource managers indicated that they were able to commit. Each resource manager then commits to the transaction and sends a confirmation to the coordinator that the transaction was successfully completed. If one or more of the participating resource managers sent an abort response, then all resource managers receive an abort command during the commit phase. Each resource manager then rolls back the transaction, and may send a confirmation to the coordinator that the transaction was rolled back.

In one embodiment, first resource manager 115 maintains a second log 134 on second data store 132, second resource manager 125 maintains a third log 135 on third data store 142, and third resource manager 140 maintains a fourth log 150 on fourth data store 128. Alternatively, the second log 134 and third log 135 may be maintained in the same data store. The second, third and fourth logs 134, 135, 150 may be undo logs (log of committed changes that occur during a distributed transaction) and/or redo logs (log of uncommitted changes that occur during a distributed transaction). The redo logs and/or undo logs can be used to rollback any changes that occurred during a distributed transaction if the transaction is aborted. The second, third and fourth logs 134, 135, 150 may also include an identify of the coordinator of the transaction, an address of the coordinator, an identification of the transaction, a process identification of a process that started the transaction, a description of the transaction, identification of other participants of the transaction, a timestamp indicating when the transaction was started and/or additional data.

At any point during a distributed transaction, one or more transaction managers and/or resource managers may fail. If a resource manager fails while acting as a participant in a distributed transaction, the resource manager may leave an unresolved transaction in a transaction log (e.g., second log 134). Likewise, if a transaction manager fails during a distributed transaction, whether acting as a participant or coordinator of the distributed transaction, the transaction manager may leave an unresolved transaction in a transaction log (e.g., first log 130).

In one embodiment, first server 105 includes a first recovery manager 160 and second server 110 includes a second recovery manager 165. The first recovery manager 160 and second recovery manager 165 are components of a recovery subsystem. The recovery subsystem is a subsystem of the distributed transaction system that manages transaction recovery. Each recovery manager in the recovery subsystem manages recovery for all resource managers and transaction managers with which the recovery manager is collocated (e.g., that operate on a same server on which the recovery manager operates). For example, first recovery manager 160 can manage transaction recovery for first resource manager 115, first transaction manager 120 and second resource manager 125.

In one embodiment, each recovery manager periodically checks contents of all transaction logs maintained by local resource managers and transaction managers. For example, first recovery manager may scan first log 130, second log 134 and third log 135 for unresolved transactions. Alternatively, the recovery managers may check the contents of the transaction logs when system resources are available (e.g., when no transactions or minimal transactions are currently being processed by local resource managers or transaction managers). In one embodiment, the recovery manager automatically scans the transaction logs of all local resource managers and transaction managers after a server that hosts the recovery manager recovers from a system failure. In another embodiment, recovery manager scans transaction logs upon receiving a command to do so (e.g., a command from an administrator).

The recovery manager determines whether there are any unresolved transactions in the scanned transaction logs. An unresolved transaction may include a transaction managed by a coordinator for which the coordinator failed to receive abort or commit confirmations from all participants. An unresolved transaction may also include a transaction for which a participant has failed to receive an abort or commit command from the coordinator. In one embodiment, the recovery manager compares the timestamp of the transaction to the current time. If the predetermined time period has elapsed since the transaction began, it is likely that the transaction is no longer active. Therefore, the recovery manager may determine that the transaction needs recovery. In a further embodiment, the recovery manager determines from the transaction log a process that began the distributed transaction. The recovery manager can contact this process to determine if the transaction has been completed. If the transaction has been completed, the recovery manager may begin recovery for the transaction. If the transaction has not completed, then no further action may be taken by the recovery manager.

Once an unresolved transaction is found, the recovery manager acts to resolve the transaction. If the unresolved transaction is found in the log of a transaction manager that acted as a coordinator for the unresolved transaction, the recovery manager resolves the transaction by contacting transaction managers and/or resource managers that acted as participants to determine if they committed or rolled back the transaction, or if they are still waiting for a command to do so. The transaction log may indicate which participants have failed to send acknowledgement messages to the coordinator. To reduce the consumption of system resources, the recovery manager can determine which participants are collocated on a server, and send a single message to a transaction manager or recovery manager of that server asking it to propagate the message to the appropriate resource managers and/or transaction manager. The recipient transaction manager or recovery manager may then gather the responses into a single message, and send that single message back to the inquiring recovery manager. Based on the received responses, the recovery manager may resolve the transaction.

If the recovery manager finds an unresolved transaction in the log of a resource manager or transaction manager that acted as a participant for the unresolved transaction, the recovery manager resolves the transaction by contacting a transaction manager that acted as a coordinator for the distributed transaction. The recovery manager can find out from the coordinator whether the transaction was committed or rolled back. In one embodiment, the recovery manager examines the logs of other resource managers and/or transaction managers with which it is collocated to determine if the transaction is unresolved for any additional resource managers or transaction managers. The recovery manager can then compile a list of participants for which the transaction is unresolved, and send a single message requesting a status of the transaction to the coordinator of the transaction. The recovery manager can then receive a single response from the transaction manager, and propagate the response to all local participants for which the transaction is unresolved. The use of a single message to determine transaction status information for multiple participants can reduce the system resources (e.g., network traffic) that are consumed in recovering from unresolved transactions.

Figure 2A:
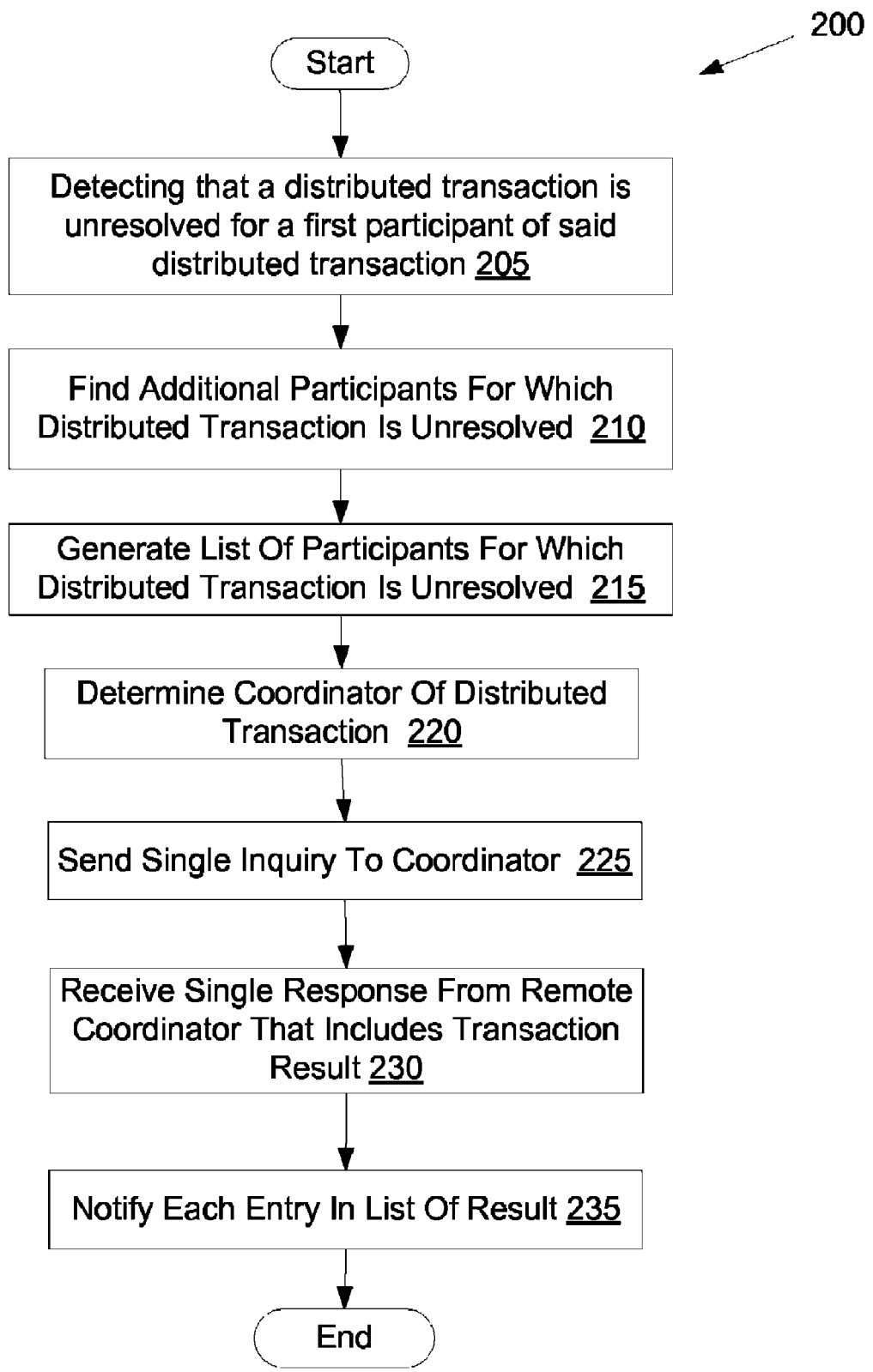
FIG. 2A illustrates a flow diagram of one embodiment for a method of resolving a two-phase commit distributed transaction.

FIG. 2A illustrates a flow diagram of one embodiment for a method 200 of recovering a two-phase commit distributed transaction. The method is performed by processing logic that comprises hardware (e.g., circuitry, dedicated logic, programmable logic, microcode, etc.), software (such as instructions run on a processing device), or a combination thereof. In one embodiment, method 200 is performed by a recovery manager (e.g., first recovery manager 160) of FIG. 1.

Referring to FIG. 2A, at block 205 a recovery manager detects that a distributed transaction is unresolved for a first participant of said distributed transaction. In one embodiment, the unresolved distributed transaction is discovered by scanning a transaction log of the participant. The transaction log may include indicate, for example, that the transaction was begun but that it was never completed. In one embodiment, the recovery manager compares a timestamp of when the transaction began to a current time to determine if the transaction needs recovery. If a predetermined period of time has passed since the transaction began, it may be determined that the transaction needs recovery. In another embodiment, the recovery manager contacts a process that started the transaction to determine if the transaction has completed. If the transaction has completed, then recovery can be initiated.

At block 210, the recovery manager finds additional participants for which the transaction is unresolved (e.g., identifies that the distributed transaction is unresolved for one or more additional participants of the distributed transaction). In one embodiment, the transaction log of the original participant identifies other participants of the transaction (e.g., includes addresses of the other participants). The recovery manager may scan transaction logs of the identified other participants to determine if the transaction is unresolved for those participants. Alternatively, the recovery manager may scan the transaction logs of all resource managers and/or transaction managers that are hosted by a same server that hosts the recovery manager to determine if they were participants of the transaction and, if so, if the transaction is unresolved for those participants.

At block 215, the recovery manager generates a list of participants for which the distributed transaction is unresolved. For example, if the recovery manager discovered one additional participant for which the distributed transaction is unresolved, the list would include two entries.

At block 220, the recovery manager determines a coordinator of the distributed transaction. In one embodiment, the coordinator is a remote coordinator (e.g., hosted by a different server than the server hosting the recovery manager). Alternatively, the coordinator may be a local coordinator (e.g., hosted by the same server that hosts the recovery manager). The identity of the coordinator (e.g., address of the coordinator) may be included in the transaction log of the participant or participants.

At block 225, the recovery manager sends a single inquiry to the coordinator. The inquiry asks the coordinator to identify a result of the transaction (e.g., whether the transaction was committed or rolled back). At block 230, the recovery manager receives a single response from the remote coordinator that includes the transaction result. At block 235, the recovery manager notifies each participant for which the transaction is unresolved of the result. In other words, each entry in the list is notified of the result. The participants may then commit or rollback the transaction based on the received result.

Figure 2B:
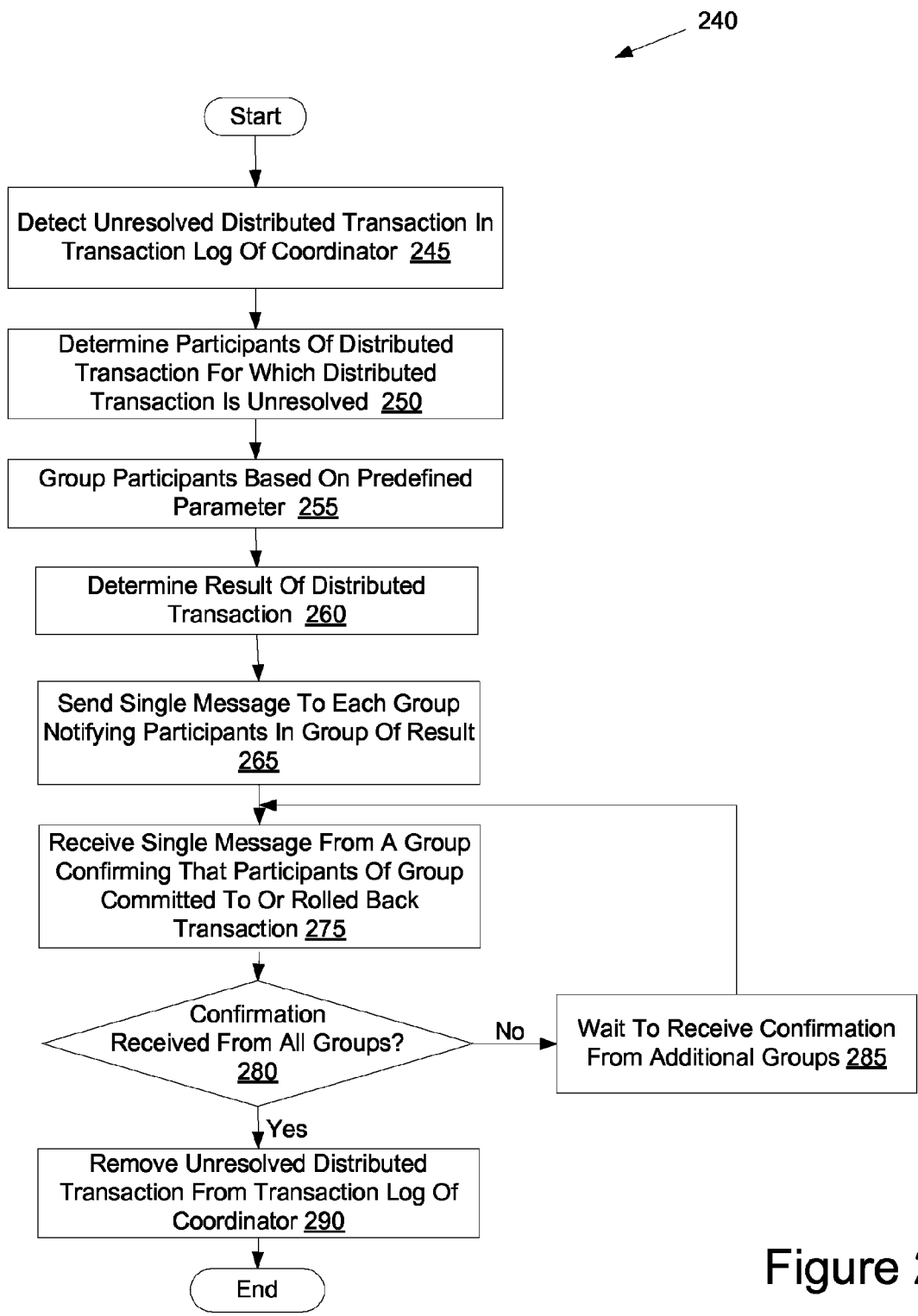
FIG. 2B illustrates a flow diagram of another embodiment for a method of resolving a two-phase commit distributed transaction.

FIG. 2B illustrates a flow diagram of another embodiment for a method 240 of recovering a two-phase commit distributed transaction. The method is performed by processing logic that comprises hardware (e.g., circuitry, dedicated logic, programmable logic, microcode, etc.), software (such as instructions run on a processing device), or a combination thereof. In one embodiment, method 250 is performed by a recovery manager (e.g., first recovery manager 160) of FIG. 1.

Referring to FIG. 2B, at block 245 a recovery manager detects an unresolved distributed transaction in a transaction log of a coordinator for the transaction. In one embodiment, the unresolved distributed transaction is discovered by scanning the transaction log. The transaction log may indicate, for example, that the transaction was begun but that it was never completed. The transaction log may also indicate one or more participants of the transaction from which commit or rollback confirmation has not been received.

At block 250, the recovery manager determines participants of the distributed transaction for which the distributed transaction is unresolved. In one embodiment, the transaction is unresolved for those participants from which confirmation has not been received.

At block 255, the recovery manager groups the participants for which the transaction is unresolved based upon a predefined parameter. For example, the recovery manager may group the participants based upon network address, server, or other criteria. In one embodiment, the recovery manager generates a list of participants for each group.

At block 260, the recovery manager determines a result of the distributed transaction. The result of the distributed transaction is included in the transaction log. Therefore, the result can be determined by stepping through the transaction log.

At block 265, the recovery manager sends a single message to each group notifying participants in the group of the result. The single message may be sent to a recovery manager that manages recovery for the group, or to a transaction manager included in the group or that coordinates the group. At block 275, the recovery manager receives a single response from a group confirming that the participants in the group either committed or rolled back the transaction, as appropriate. The response may be received from a recovery manager that manages recovery for the group or a transaction manager included in the group or that coordinates the group.

At block 280, the recovery manager determines whether confirmation has been received from all groups. If confirmation has not been received from all groups, the method proceeds to block to 85 and the recovery manager waits to receive confirmation from additional groups. If confirmation has been received from all groups, the recovery manager removes the unresolved distributed transaction from the transaction log of the coordinator (block 290).

Figure 3:
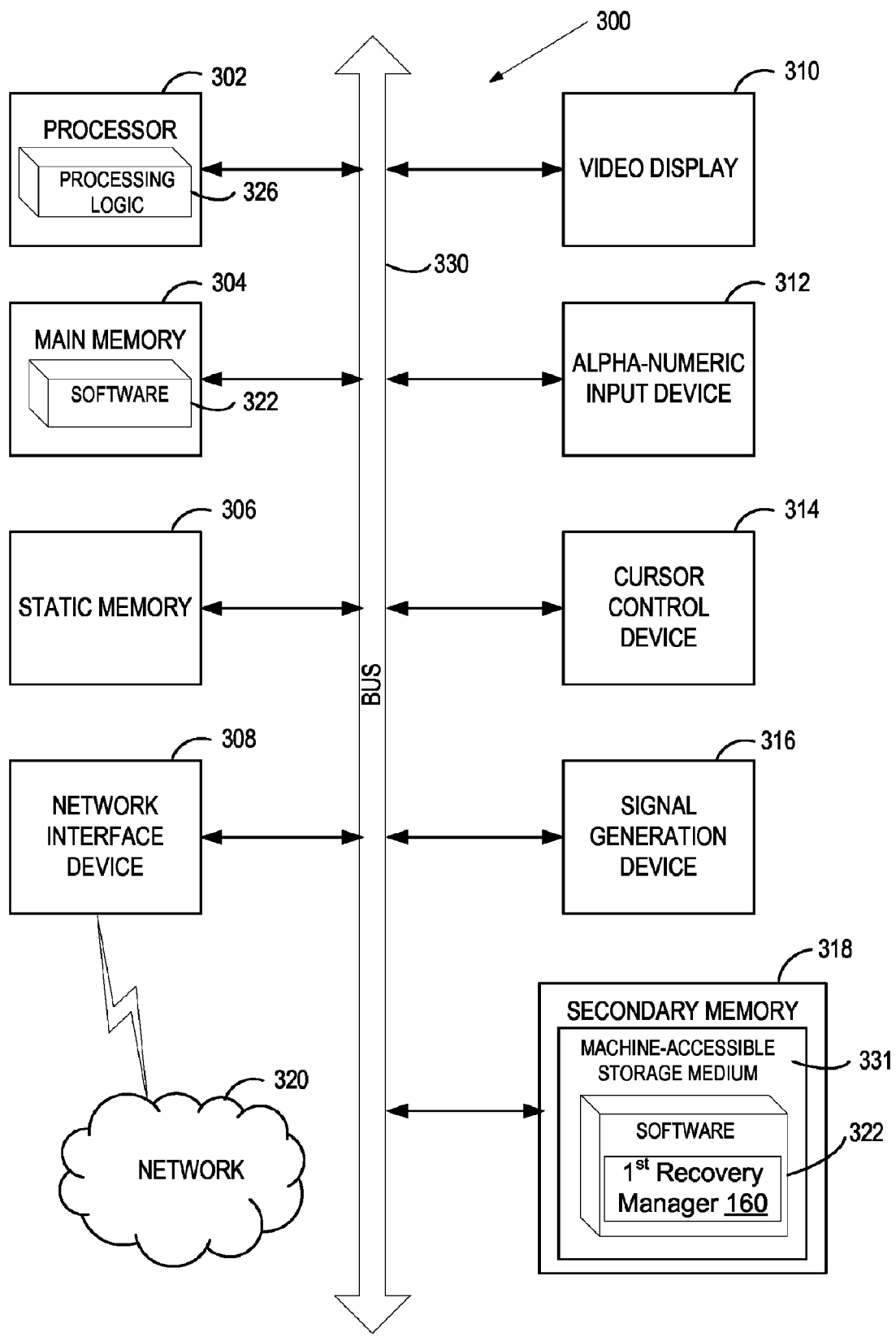
FIG. 3 illustrates a block diagram of an exemplary computer system, in accordance with one embodiment of the present invention.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory 318 (e.g., a data storage device), which communicate with each other via a bus 330.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute the processing logic 326 for performing the operations and steps discussed herein.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The secondary memory 318 may include a machine-readable storage medium (or more specifically a computer-readable storage medium) 331 on which is stored one or more sets of instructions (e.g., software 322) embodying any one or more of the methodologies or functions described herein. The software 322 may also reside, completely or at least partially, within the main memory 304 and/or within the processing device 302 during execution thereof by the computer system 300, the main memory 304 and the processing device 302 also constituting machine-readable storage media. The software 322 may further be transmitted or received over a network 320 via the network interface device 308.

The machine-readable storage medium 331 may also be used to store a recovery manager (e.g., first recovery manager 160 of FIG. 1) and/or a software library containing methods that call recovery managers. While the machine-readable storage medium 331 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method comprising:
   scanning transaction logs of distributed transaction participants to determine if they have any unresolved distributed transactions;
   detecting that a distributed transaction is unresolved for a first participant of said distributed transaction based on said scanning;
   identifying that the distributed transaction is unresolved for a second participant of said distributed transaction;
   generating a list of participants for which the distributed transaction is unresolved, the list including an entry for the first participant and an additional entry for the second participant;
   determining a result of the distributed transaction based on information received from a coordinator of said distributed transaction, wherein said determining comprises sending a single message to the coordinator of the distributed transaction to inquire whether the distributed transaction was committed or rolled back and receiving a single commit or roll back message from the coordinator; and
   notifying each participant identified in the list of the result, wherein each participant recovers the distributed transaction upon receiving the result.

2. The method of claim 1, wherein the first participant and the second participant are each one of a transaction manager or a resource manager.

3. The method of claim 1, further comprising:
   periodically scanning the transaction logs of the participants to determine if they have any unresolved distributed transactions.

4. The method of claim 1, wherein the participants identified in the list recover the distributed transaction concurrently.

5. A computer readable storage medium including instructions that, when executed by a processing system, cause the processing system to perform a method comprising:
   scanning transaction logs of distributed transaction participants to determine if they have any unresolved distributed transactions;
   detecting that a distributed transaction is unresolved for a first participant of said distributed transaction based on said scanning;
   identifying that the distributed transaction is unresolved for a second participant of said distributed transaction;
   generating a list of participants for which the distributed transaction is unresolved, the list including an entry for the first participant and an additional entry for the second participant;
   determining a result of the distributed transaction based on information received from a coordinator of said distributed transaction, wherein said determining comprises sending a single message to the coordinator of the distributed transaction to inquire whether the distributed transaction was committed or rolled back and receiving a single commit or roll back message from the coordinator; and
   notifying each participant identified in the list of the result, wherein each participant recovers the distributed transaction upon receiving the result.

6. The computer readable storage medium of claim 5, wherein the first participant and the second participant are each one of a transaction manager or a resource manager.

7. The computer readable storage medium of claim 5, the method further comprising:
   periodically scanning the transaction logs of the participants to determine if they have any unresolved distributed transactions.

8. The computer readable storage medium of claim 5, wherein the participants identified in the list recover the distributed transaction concurrently.

9. A computing apparatus comprising:
   a first data store;
   a first resource manager to manage the first data store and to participate in a distributed transaction;
   a second data store;
   a second resource manager to manage the second data store and to participate in the distributed transaction; and
   a recovery manager to detect that the distributed transaction is unresolved for the first resource manager based on scanning transaction logs of the first resource manager to determine if the first resource manager has any unresolved distributed transactions, to determine that the distributed transaction is also unresolved for the second resource manager based on scanning transaction logs of the second resource manager to determine if the second resource manager has any unresolved distributed transactions, to generate a list of participants for which the distributed transaction is unresolved, the list including an entry for the first resource manager and an additional entry for the second resource manager, to determine a result of the distributed transaction based on sending a message to a transaction manager that coordinated the distributed transaction to inquire whether said distributed transaction was committed or rolled back and to receiving a commit or roll back response from the transaction manager, and to notify each participant identified in the list of the result.

10. The computing apparatus of claim 9, further comprising:
the recovery manager to periodically scan the transaction logs of the first resource manager and the second resource manager to determine if they have any unresolved distributed transactions.

11. The computing apparatus of claim 9, further comprising:
a transaction manager to coordinate transactions that include at least one of the first resource manager and the second resource manager;
the recovery manager to determine that the distributed transaction is unresolved for the transaction manager and to determine from a transaction log of the transaction manager all participants of the distributed transaction for which the distributed transaction is unresolved.

12. The computing apparatus of claim 11, further comprising:
the recovery manager to group the participants of the distributed transaction for which the transaction is unresolved based on a predefined criteria, to send a single message to each group asking whether the participants in the group committed or rolled back the transaction, and to receive a single response from each group.

13. A computer implemented method comprising:
detecting an unresolved distributed transaction in a transaction log of a coordinator based on scanning the transaction log of the coordinator to determine if it has any unresolved distributed transactions;
determining that the distributed transaction is unresolved for one or more participants of said distributed transaction based on the scanning;
grouping the participants based on a predefined parameter;
determining a result of the distributed transaction based on the transaction log; and sending a single message to each group notifying participants in the group of the result;
receiving confirmation from each group that participants of the group have committed to or rolled back the transaction in accordance with the result; and
removing a transaction log entry of the coordinator that corresponds to the distributed transaction.

14. The method of claim 13, further comprising:
periodically scanning the transaction log of the coordinator to determine if said coordinator has any unresolved distributed transactions.

* * * * *